US006446073B1

(12) United States Patent
D'Amato et al.

(10) Patent No.: US 6,446,073 B1
(45) **Date of Patent: *Sep. 3, 2002**

(54) METHODS FOR WRITING AND READING COMPRESSED AUDIO DATA

(75) Inventors: Andrea D'Amato; Michel D. Berhan, both of San Jose, CA (US)

(73) Assignee: Roxio, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/414,378

(22) Filed: Oct. 7, 1999

Related U.S. Application Data

(60) Provisional application No. 60/139,921, filed on Jun. 17, 1999.

(51) Int. Cl.[7] .......................... G06F 17/30; G10H 7/00

(52) U.S. Cl. .......................... 707/101; 707/104; 84/609

(58) Field of Search .......................... 707/104, 203, 707/101, 100, 102; 369/44.24, 32, 48; 704/215, 500; 386/87; 360/73; 711/1; 84/609, 602

(56) References Cited

U.S. PATENT DOCUMENTS 5,721,856 A * 2/1998 Takeuchi .................. 711/1
5,864,816 A * 1/1999 Everett .................. 704/500
5,940,574 A * 8/1999 Iwamoto et al. .............. 386/87
6,029,127 A * 2/2000 Delargy et al. .............. 704/215
6,052,148 A * 4/2000 Morishita .................. 348/384
6,058,091 A 5/2000 Yokota et al. .............. 369/93
6,091,686 A 7/2000 Caffarelli et al. ........ 369/53.24
6,097,557 A * 8/2000 Inoue et al. .............. 360/13
6,118,737 A 9/2000 Hütter .................. 369/30.12
6,118,754 A 9/2000 Sako et al. .............. 369/275.3
6,134,202 A * 10/2000 Tsutsui .................. 369/48
6,141,489 A 10/2000 Honda .................. 386/95
6,246,645 B1 * 6/2001 Tsutsui .................. 369/44.24
6,292,840 B1 * 9/2001 Bloomfield-Brown et al. ... 709/247
6,320,825 B1 * 11/2001 Bruekers et al. .............. 369/32

* cited by examiner

*Primary Examiner*—Sanjiv Shah
(74) *Attorney, Agent, or Firm*—Martine & Penilla, LLP

(57) ABSTRACT

A method for writing compressed audio data to a compact disc media is provided. The method includes selecting songs to be written in a session and reserving a first track. After the first is reserved, the method proceeds to writing a first temporary data structure and audio data to a second track following the first track. After the second track is closed, part of first temporary data structure (e.g., the recompiled INFO.CD3 part) is written to the reserved first track and the session is closed. Another method includes beginning a session writing the compressed audio data to the compact disc media. A track that includes a file system and an audio data section is then written. The writing of the track further includes writing an INFO.CD3 file, writing an ISO file system, and writing a FILEINFO.LC file following the ISO file system. Once the audio data section is written, the method proceeds to closing the track and closing the session.

12 Claims, 10 Drawing Sheets

METHODS FOR WRITING AND READING COMPRESSED AUDIO DATA

CROSS REFERENCE TO RELATED APPLICATIONS

This application claims priority from U.S. Provisional Patent Application No. 60/139,921, filed Jun. 17, 1999, and entitled "Physical Format, Volume and File Structure, and Recording and Reading Compressed Audio." This provisional application is herein incorporated by reference. This application is also related to U.S. patent application Ser. No. 09/414,379, U.S. Pat. No. 6,353,173 filed on the same day as the instant application and entitled "Compressed Audio Data Format and File System Structures." This application is hereby incorporated by reference.

BACKGROUND OF THE INVENTION

1. Field of the Invention

This invention relates generally to audio data storage formats, and more particularly to the physical format of audio data written to compact discs (CDs) in a compressed format.

2. Description of the Related Art

As is well known, the primary user of CDs is the music recording industry. An advantage of CDs is that data is digitally stored and end users are sure to get the same quality recording years after first purchasing the CD as when the CD was initially recorded. Although pre-recorded CDs are well received by consumers, with the advent of recordable CDs, such as, compact disc recordables (CD-Rs), users are quickly realizing that uncompressed data takes up a substantial amount of space.

By way of example, today many companies make audio titles available for sale over the Internet. Computer users therefore have a need to transfer downloaded music titles form their computer hard drives to, for example, a CD. However, most well known audio data recording applications record music in a format that does not allow for a large amount of music data to be recorded. As a result, users that want to store music titles onto a CD media have to use multiple discs to complete the task.

In view of the foregoing, there is a need for compressed audio data formats and techniques for writing the audio data formats onto a CD media. The compressed audio data format should allow for the storage of substantially more music data onto standard size CD media. Once recorded, the music data should be accessible by way of a standard computer system that communicates with a file system that provides access to the music data, or audio players having microcontroller hardware or software to directly access the compressed data stored on the CD media.

SUMMARY OF THE INVENTION

Broadly speaking, the present invention describes a format, method, and computer readable media for writing compressed audio data to a compact disc media. The writing of the compressed audio data includes the writing of a format that facilitates access to the audio data by a personal computer accessing a file system or a microcontroller based player. It should be appreciated that the present invention can be implemented in numerous ways, including as a process, an apparatus, a system, a device, a method, or a computer readable medium. Several inventive embodiments of the present invention are described below.

In one embodiment, a method for writing compressed audio data to a compact disc media is disclosed. The method includes selecting songs to be written in a session and reserving a first track. After the first is reserved, the method proceeds to writing a first temporary data structure and audio data to a second track following the first track. After the second track is closed, the first temporary data structure is written to the reserved first track and the session is closed. The writing of the first temporary data structure further includes writing an INFO.CD3 file in a first sector of the second track and writing a FILEINFO.LC file in sectors following the first sector of the same second track. Zeros are then written to fill-in a remainder of a sector containing at least part of the FILEINFO.LC file. In one specific example, the writing of the temporary data structure includes writing the INFO.CD3 file to a sector 15 of the first track, writing a file system (i.e., ISO 9660 File System) beginning at a sector 16 of the first track.

In another embodiment, a method for writing compressed audio data to a compact disc media is disclosed. The method includes beginning a session writing the compressed audio data to the compact disc media. A track includes a file system followed by an audio data section. The writing of the file system includes writing an INFO.CD3 file and an ISO 9660 file system. Once the track is written, the method proceeds to closing the track and closing the session. In this preferred embodiment, the INFO.CD3 and FILEINFO.LC files define a microcontroller system structure (MSS) that is independently accessible to a microcontroller-based player.

In yet another embodiment, a computer readable media having program instructions for writing compressed audio data to a compact disc media is disclosed. The operations of the computer readable media include program instructions for selecting songs to be written in a session and program instructions for reserving a first track. Once the first track is reserved, the computer readable media includes program instructions for writing a first temporary data structure and audio data to a second track following the first track. Then, program instructions are provided for closing the second track and writing the first temporary data structure to the reserved first track. In this embodiment, when the first temporary data structure is written to the reserved first track, the writing of the first temporary data structure includes program instructions for writing an INFO.CD3 file and an ISO 9660 file system to the reserved first track. Program instructions then follow to close the session.

In still another embodiment, a computer readable media having program instructions for writing compressed audio data to a compact disc media is disclosed. The operations of the computer readable media include: (a) program instructions for beginning a session writing the compressed audio data to the compact disc media; (b) program instructions for writing a track including a file system and an audio data section. The writing of the file system further includes: (i) program instructions for writing an INFO.CD3 file; and (ii) program instructions for writing an ISO 9660 file system. The computer readable media then includes: (c) program instructions for closing the track; and (d) program instructions for closing the session.

In a preferred embodiment, during the writing of a CD3 music CD, a session can be written at once or during separate multiple times. When the CD3 music CD session is written at one time, the CD is preferably written in the form of only one track that contains an ISO file system 302 and audio files data 124*b* (e.g., see FIG. 8A). When the CD3 music CD session is written during different record phases, it will contain at least two or more tracks; one for the file system information and one or more for the data.

As will be discussed below, the CD music CD session can contain more than one data track that is written during different recording phases. In this case the session is preferably formatted with the first track reserved for the ISO 9660 file system, which has a length of 300 Kbytes or more. Each data track will contain a temporary data structure (TDS) that includes microcontroller data structure information for the construction of the file system when the session is closed (e.g., INFO.CD3+FILEINFO.LC files).

When the session is written in the incremental way, at least 2 tracks are required in the session: one for the file system and one for the data track. The file system track contains the ISO 9660 file system structure and at minimum the INFO.CD3 file. The INFO.CD3 file is written at a relative sector address 15 of the first track of the current session. Of course, any other sector can also be used if modifications are made to the CD3 specification defined herein. The current track is reserved before the first data track is written. The track can have a variable length with a minimum of 300 Kbytes, in this embodiment. The ISO 9660 file system and INFO.CD3 are written just after last data track is written and before the current session is closed as will be described with reference to FIG. 5. In a further embodiment, if the file system structure is bigger than the current file system track length, a new file system track will be written at the end of the last data track. In this example, the file system will be written in the last track, while the INFO.CD3 structure and PVD will be written in the first file system track.

With regard to reading the CD3 music data, a CD3 music CD disc preferably contains one type of data retrieval structure, which is advantageously compatible to different types of playback systems. For example, one type of playback system is by way of the file system structure (FSS) that preferably conforms to the CD-ROM XA specification. Another is by way of the microcontroller system structure (MSS). The MSS is intended for microcontroller-based playback systems, which can be in the form of a CD3 player. CD3 players can be part of an automobile audio CD player, a home CD player, a portable CD player and the like.

The file system structure (FSS) and the microcontroller system structure (MSS) of a session give independent access to all the data on the disc from the first session up to and including the current session.

The file system structure (FSS) allows personal computers to retrieve and play audio files accessing the files in the DATA directory. The direct access to the relative sector address 15 of the current session allows microcontroller-based playback systems to retrieve all the information needed to play the audio files.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

Figure 1A:
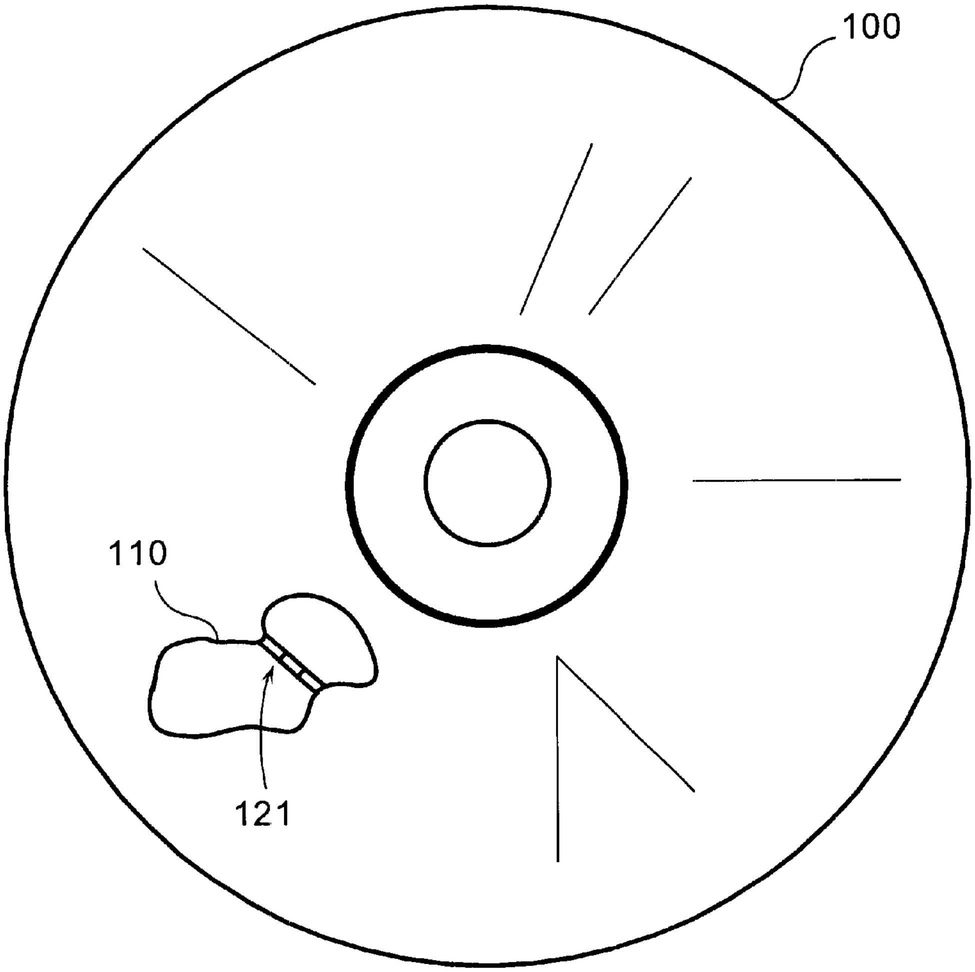
FIG. 1A illustrates a top view of a compact disc, which may be configured to store audio data in a CD3 format.

An invention is described for a format, method, and computer readable media for writing compressed audio data to a compact disc media. The writing of the compressed audio data includes the writing of a format that facilitates access to the audio data by a personal computer accessing a file system or a microcontroller based player. It will be obvious, however, to one skilled in the art, that the present invention may be practiced without some or all of these specific details. In other instances, well known process operations have not been described in detail in order not to unnecessarily obscure the present invention.

The present invention is directed toward a method, computer readable media having program instructions, and hardware for recording music data and associated information which can be accessed, identified and played. The music data is recorded and accessed by way of an inventive file system. For ease of discussion, this inventive format is referred to herein as a "CD3" format.

Accordingly, the following disclosure defines a file system for CD3 recording, and includes a description of the physical and logical layout of a CD3 format. Thus, CD3 music discs incorporate a system for storing highly compressed audio files onto compact discs (CDs). In addition to compressed audio files, a CD3 music CD can optionally contain digital images and associated text for lyrics. In a preferred embodiment, a CD3 CD will conform with the well known multi-session compact disc specification and the ISO 9660 file structure specification.

For definitional purposes, the following terms shall have the following meanings: (1) an application program is a program that processes the contents of a file, and may also process selected attribute data relating to the file or to the volume(s) on which the file is recorded; (2) a byte is a string of eight binary bits operated upon as a unit; (3) a sector (also referred to as a block) is the smallest addressable part of the recorded area on storage media that can be accessed independently of other addressable parts of the recorded area, all media within the same volume set shall have the same physical sector size; (4) an MSF Format is the Sector address and the Subcode-Q channel time codes are encoded in the MSF format; the MSF format is a 6 digit BCD encoded number, the first (most significant) two digits contain the minutes fraction, the next two digits contain the seconds fraction and the last (lease significant) two digits contain the frames fraction of the subcode time code or sector address; (5) a relative sector address of a sector is equal to the Logic Sector Address of that sector minus the Logical Sector Address that corresponds with the table of contents (TOC) value of the first Track of the section in which the sector is located; (6) a session, as defined in the Orange Book is an area on the disc consisting of a Lead-In area, a Program area, and a Lead-Out area.

Any number of tracks may be written in a single session, up to a total of 99 tracks per disc; (7) a single session disc contains one session and it is referred to as a Single Session disc; (8) a multisession disc is a disc that contains more than one session; (9) a data session is a session of which the first track in the program area is a data track; (10) a CD-ROM XA session is a session of which the first track in the program area is a CD-ROM XA track; (11) a track is a physical area of the disc preceded by a pre-gap and followed by a post-gap (as defined in the Red Book), no more than 99 tracks may be written per disc; (12) a data track is a track that contains sectorized data according to the Yellow Book; and (13) a CD-ROM XA track is a data track that contains sectors in the Mode 2 Form 1 and/or Form 2 according the CD-ROM XA Specification.

FIG. 1A illustrates a top view of a compact disc 100, which may be configured to store audio data in the aforementioned CD3 format. By way of example, the CD3 format will enable writing of audio data to a plurality of tracks 121, which are illustrated by magnification 110. In general, the compact disc 100 can be any suitable disc that can be written with digital data, such as CD-R discs, CD-RW discs and the like.

Figure 1B:
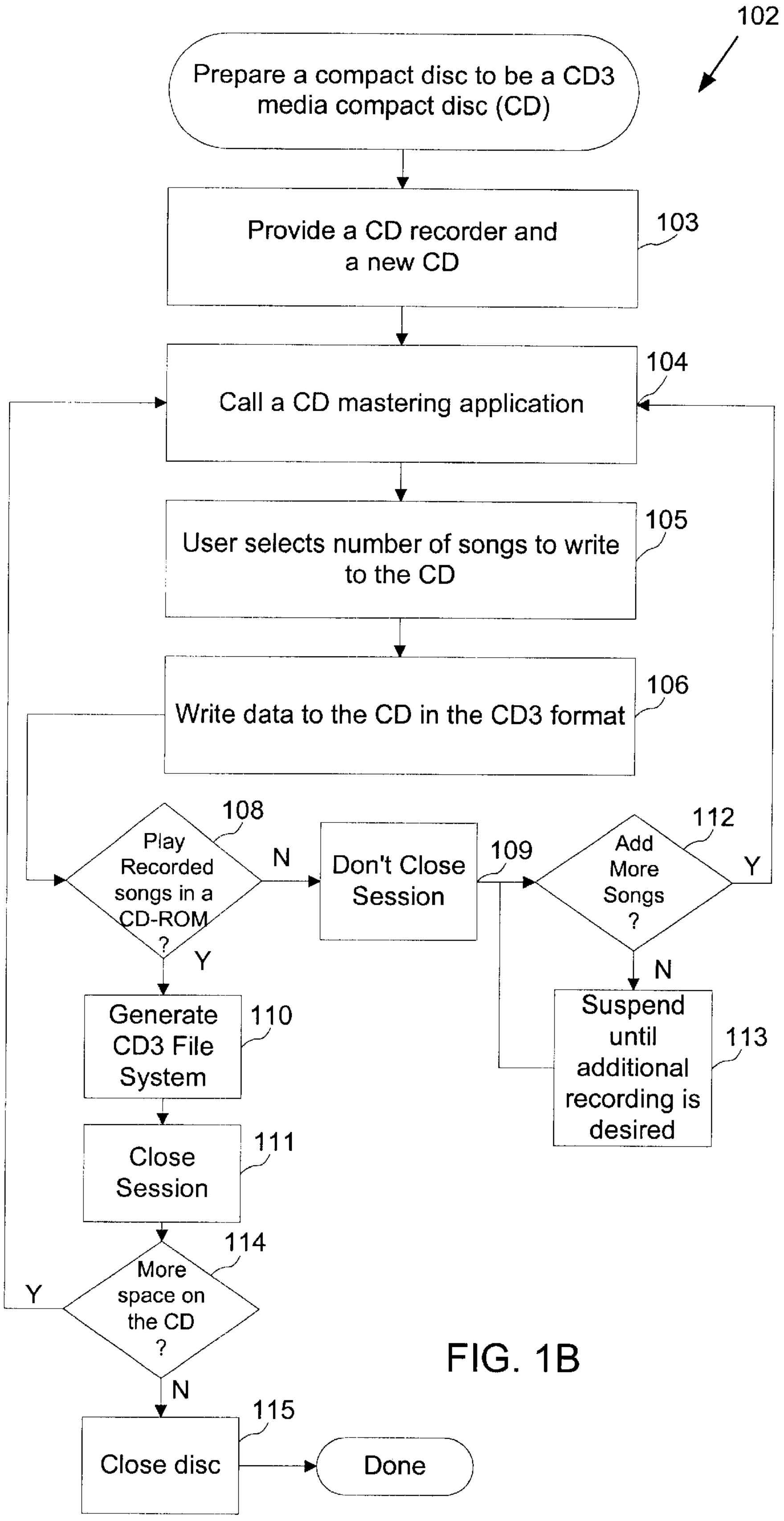
FIG. 1B illustrates a flowchart diagram describing the method operations performed in preparing a compact disc to be a CD3 music compact disc (CD), in accordance with one embodiment of the present invention.

FIG. 1B illustrates a flowchart diagram 102 describing the method operations performed in preparing a compact disc to be a CD3 music compact disc (CD). The method begins at an operation 103 where a CD recorder (e.g., such as a CD-R recorder or a CD-RW recorder) is provided and a new CD that has not previously been recorded is provided. Once the CD recorder and the new CD are provided in operation 103, the method will proceed to an operation 104 where a CD mastering application is called. The CD mastering application is configured to enable the CD recorder to record data to the new CD. Preferably, the CD mastering application will be enabled with computer instructions for recording the new CD in the CD3 format, which is described in detail herein.

The method now proceeds to an operation 105 where a user selects the number of songs to write to the CD. By way of example, the user may desire to write the contents of several conventional compact discs onto the new CD. As mentioned above, the CD3 format will enable the recording of compressed audio data onto the new CD in a manner that can potentially allow the recording of up to about 9999 songs and associated data. Typically, a standard compact disc having music recorded for conventional listening by way of a CD-ROM or standard audio compact disc player holds between 1 and 99 songs (i.e., tracks) per disc. This number can vary, but it should be understood that this is substantially less than can be recorded using the CD3 format.

Accordingly, once the user has selected the number of songs to write to the CD, the method will proceed to an operation 106 where the songs that were selected by the user are written to the CD in the CD3 format. Once those songs have been written in the CD3 format in operation 106, the method will proceed to a decision operation 108 where it is determined whether the recorded songs are desired to be played using a CD-ROM. If there is no desire to play the songs that have just been written, the session will not be closed in operation 109 and the method will proceed to operation 112.

In operation 112, it is determined if more songs are to be added to the current compact disc. If at the current time, no songs are to be added, the method will proceed to operation 113 where the adding of songs to the compact disc will be suspended until additional recording is desired. When additional recording is desired, the method will proceed to operation 104 where the CD mastering application will again be called. The user will then select a number of songs to write to the CD in operation 105 and then write the data to the CD in the CD3 format in operation 106. If the user desires to play back the recorded songs in a CD-ROM in operation 108, the method will proceed to an operation 110 where the CD3 file system is generated and written to a reserved track. As defined herein, the reserved track is before the first track of data written in the CD3 format. The first track of data is actually the second track of a session.

A more detailed description of the reserved track and the writing in the CD3 format will be provided below with reference to FIGS. 2 through 6B. Once the CD3 file system is generated in operation 110, the method will proceed to an operation 111 where the session will be closed. Once the session is closed, the method will proceed to an operation 114 where it is determined if there is more space on the CD. If there is more space, the method may proceed back up to operation 104 for the addition of more songs to the CD. Alternatively, if there is no more space on the CD, the method will proceed to operation 115 where the disc will be closed and the method will end.

Figure 1C:
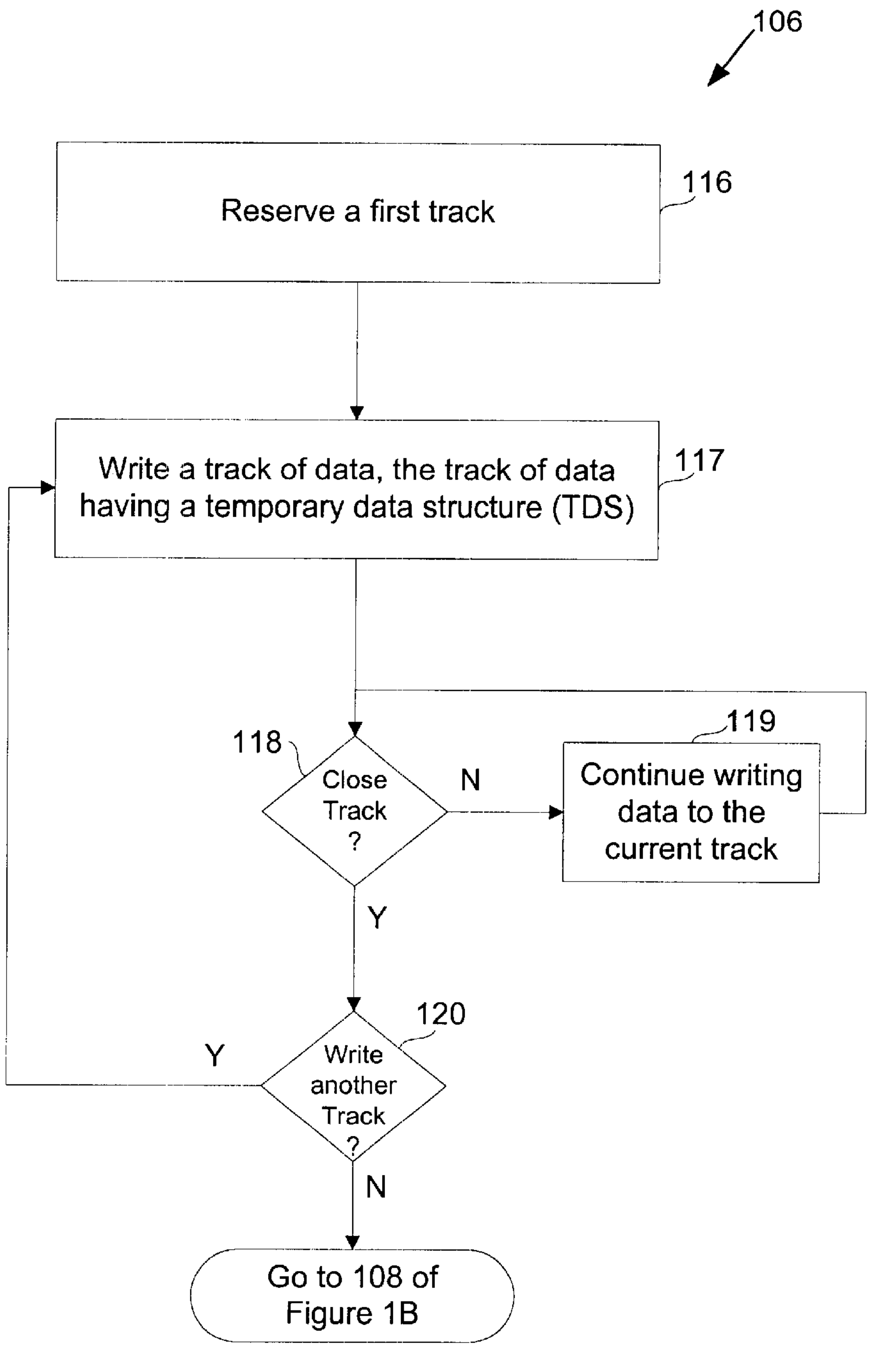
FIG. 1C illustrates a more detailed flowchart diagram of the writing of the data to the CD in the CD3 format, in accordance with one embodiment of the present invention.
Figure 2:
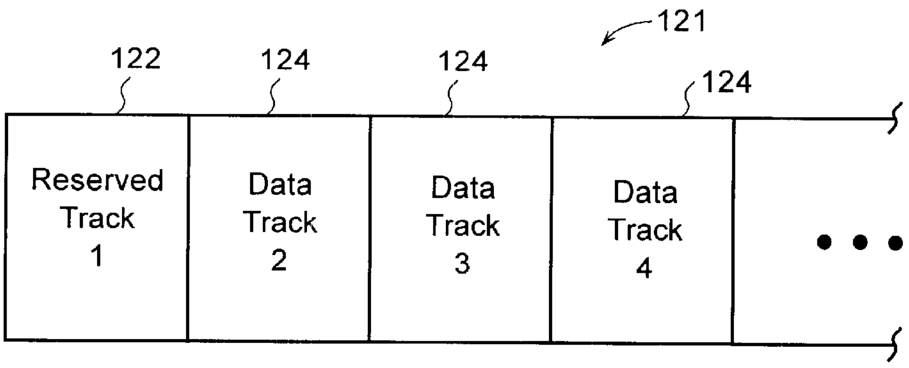
FIG. 2 illustrates the initial writing of a session wherein a first track is reserved, and writing will commence beginning in a second track and extend for any number of desired tracks, in accordance with one embodiment of the present invention.
Figure 3:
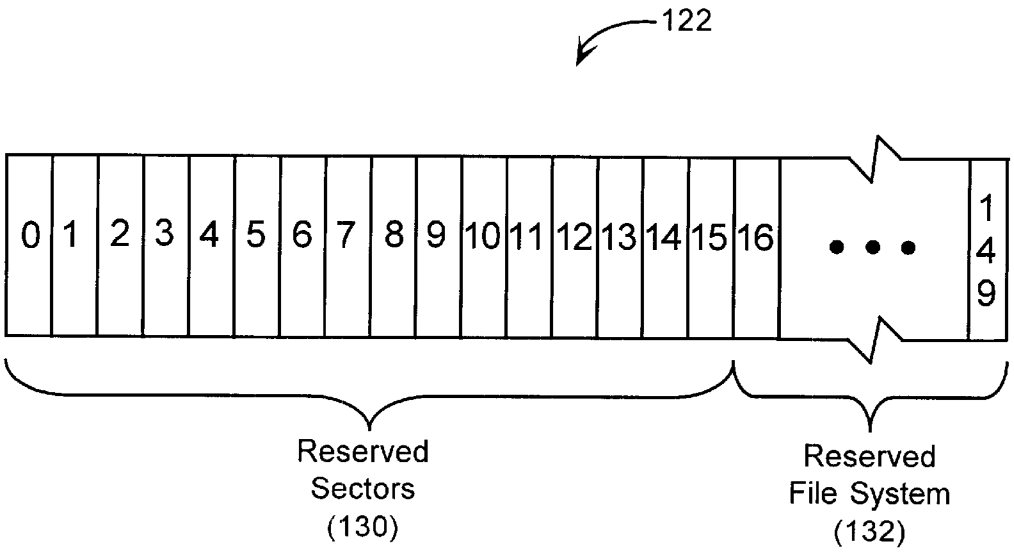
FIG. 3 illustrates a typical track, in accordance with one embodiment of the present invention.

FIG. 1C illustrates a more detailed flowchart diagram of operation 106 which describes the writing of the data to the CD in the CD3 format. The method first reserves a track in operation 116 as shown in FIG. 2. FIG. 2 illustrates the initial writing of a session wherein a first track 122 (i.e., track 1) is reserved and writing will commence beginning in track 2 and extend for any number of desired tracks 124. As shown in FIG. 3, a track has a minimum of 150 sectors spanning between sector 0 and sector 149. The sectors 0–15 (130) are reserved sectors. Beginning at sector 16, all sectors are reserved for the file system (132). An ISO 9660 file system of 150 sectors contains about 4000 file entries.

Figure 4:
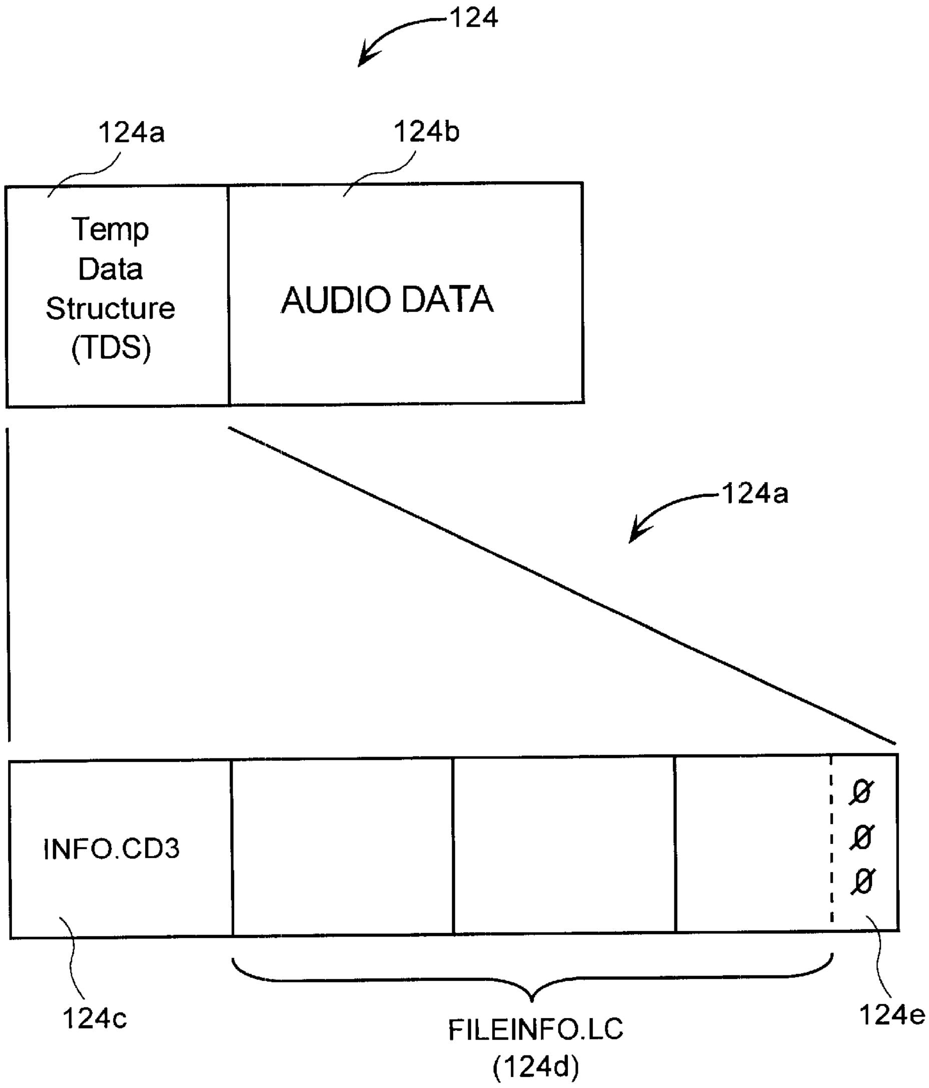
FIG. 4 illustrates a more detailed view of a data track of FIG. 2, in accordance with one embodiment of the present invention.

FIG. 4 illustrates a more detailed view of a data track 124 of FIG. 2, in accordance with one embodiment of the present invention. A data track 124 will include a temporary data structure (TDS) **124*a* followed by audio data 124*b*. TDS 124*a* will generally include a file called INFO.CD3 (i.e., of 1 sector length) 124*c* and a file called FILEINFO.LC 124*d*. If the FILEINFO.LC 124*d* does not completely fill a particular sector, the remaining part of the sector will be padded with zeros as shown in 124_e_. As will be described in greater detail, when the file system is generated, only the recompiled INFO.CD3 124_c_ and an ISO 9660 file system will be written to the reserved track. The most recently recompiled FILEINFO.LC 124_d_ will remain in the last TDS and can be referenced by the INFO.CD3 as described with reference to FIG. 6B below. A more detailed description of the contents of the INFO.CD3** file and FILEINFO.LC is provided below.

Referring back to FIG. 1C, once the first track has been reserved as shown in FIG. 2, the method will proceed to an operation 117 where a track of data is written beginning at track to 124 shown in FIG. 2. The track of data that is written at-once will have a temporary data structure (TDS). As mentioned above, the temporary data structure (TDS) is shown in FIG. 4 and will include the files INFO.CD3 and FILEINFO.LC. The method will now proceed to a decision operation 118 where it is determined whether the current track should be closed. If it is determined that the current track should not be closed, the method will proceed to operation 119 where the writing of data to the current track will continue.

Once it is determined that the current track should be closed, the method will proceed to an operation 120 where it is determined whether there is a desire to write another track. If another track is desired to be written, the method will again proceed to operation 117 where the track of data will be written following the previous track, and the current track will have a temporary data structure (TDS), which will be recompiled using the information of the TDS of the previously written track and of the current track. If it is determined that no more tracks are to be written, the method will proceed to operation 108 of FIG. 1B.

Figure 5:
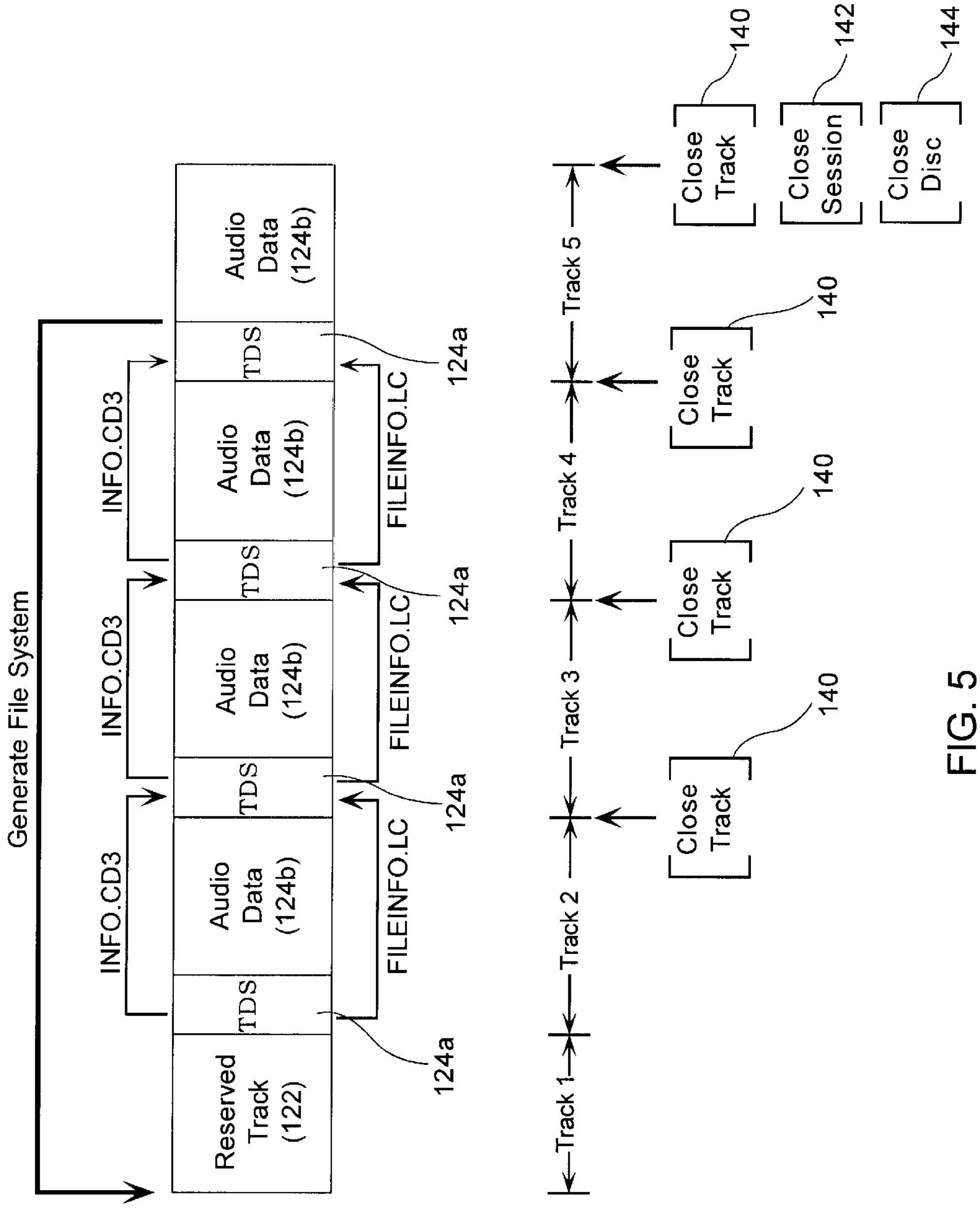
FIG. 5 provides a pictorial diagram of a plurality of data tracks written in the CD3 format to a CD in accordance with one embodiment of the present invention.

FIG. 5 provides a pictorial diagram of a plurality of audio tracks written in the CD3 format to a CD in accordance with one embodiment of the present invention. As described above, when audio data is initially written to a CD in an incremental manner (i.e., one track at a time), wherein the session is not closed after each track, an initial track one 122 is reserved. The writing of audio data begins on the second track wherein a first temporary data structure (TDS) 124_a_ is written followed by the audio data 124_b_. Once the second track is closed 140, a next track is written beginning with the temporary data structure 124_a_ which is recompiled using the INFO.CD3 and FILEINFO.LC of the previously written track.

After the TDS is complete for the second written audio track, the audio data 124_b_ will be written and then the track will be closed 140. The next audio track begins with the TDS which is again recompiled using the TDS of the previous audio track, and then the audio data 124_b_ is written until the track is closed 140. The user will then desire to write a fourth track beginning with the temporary data structure which is again recompiled using the information from the INFO.CD3 and FILEINFO.LC of the previous and current TDS. Once the TDS for track 5 has been written, the method will proceed to writing the audio data 124_b_ of track 5.

Track 5 will then be closed 140 which will be followed by the generation of the file system in the reserved track 122. Once the file system has been generated in the reserved track 122, the session will be closed 142. If there is more space on the disc and the user desires to write additional tracks of data on the same disc, the user may begin a new session wherein the first track will be reserved and the audio tracks will be written in the technique described above. Assuming that the user does not desire to write additional sessions at this time, and/or the disc is substantially full, the method will proceed to close the disc 144.

Figure 6A:
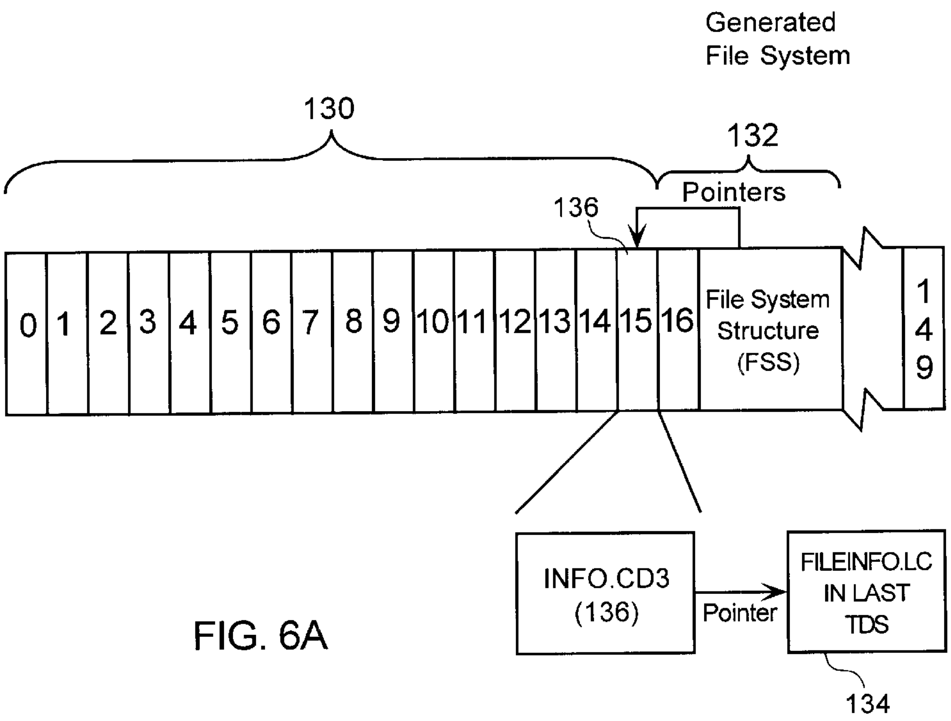
FIG. 6A shows the generated file system that was written to the reserved track before the session was closed as shown in FIG. 5, in accordance with one embodiment of the present invention.

FIG. 6A shows the generated file system that was generated in the reserved track before the session was closed as shown in FIG. 5, in accordance with one embodiment of the present invention. Sectors zero through 14 are preferably left reserved for future use, while sector 15 136 is used to store the INFO.CD3 file. The ISO 9660 File System 132 is written starting at the relative sector 16 of the current session. As pictorially illustrated, the file system structure (FSS) will have pointers that refer to the INFO.CD3 file 136, and the INFO.CD3 file 136 will also have pointers referring to the FILEINFO.LC 134. It should be understood that the INFO.CD3 136 is the recompiled INFO.CD3 file for all of the tracks, and the FILEINFO.LC 134 is the recompiled FILEINFO.LC file that will remain in the last TDS. In other words, the last FILEINFO.LC file will not be written to the reserved track.

Figure 6B:
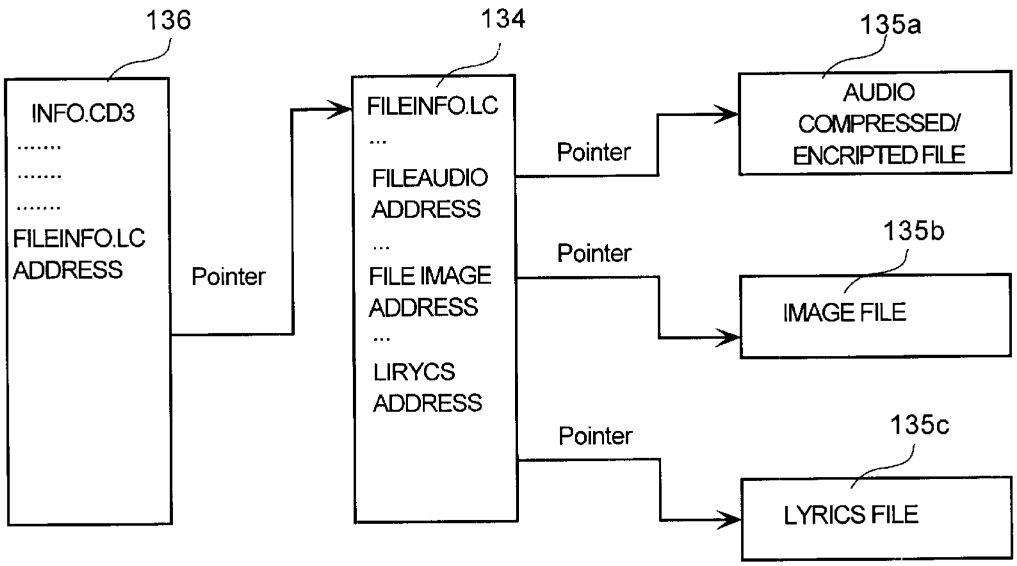
FIG. 6B illustrates a block diagram of the INFO.CD3 file which has a pointer to the FILEINFO.LC, in accordance with one embodiment of the present invention.

FIG. 6B illustrates a block diagram of the INFO.CD3 136 file which has a pointer to the FILEINFO.LC 134. The FILEINFO.LC 134 will also have pointers to compressed and encrypted audio files 135_a_, image files 135_b_, and lyrics files 135_c_.

Figure 7:
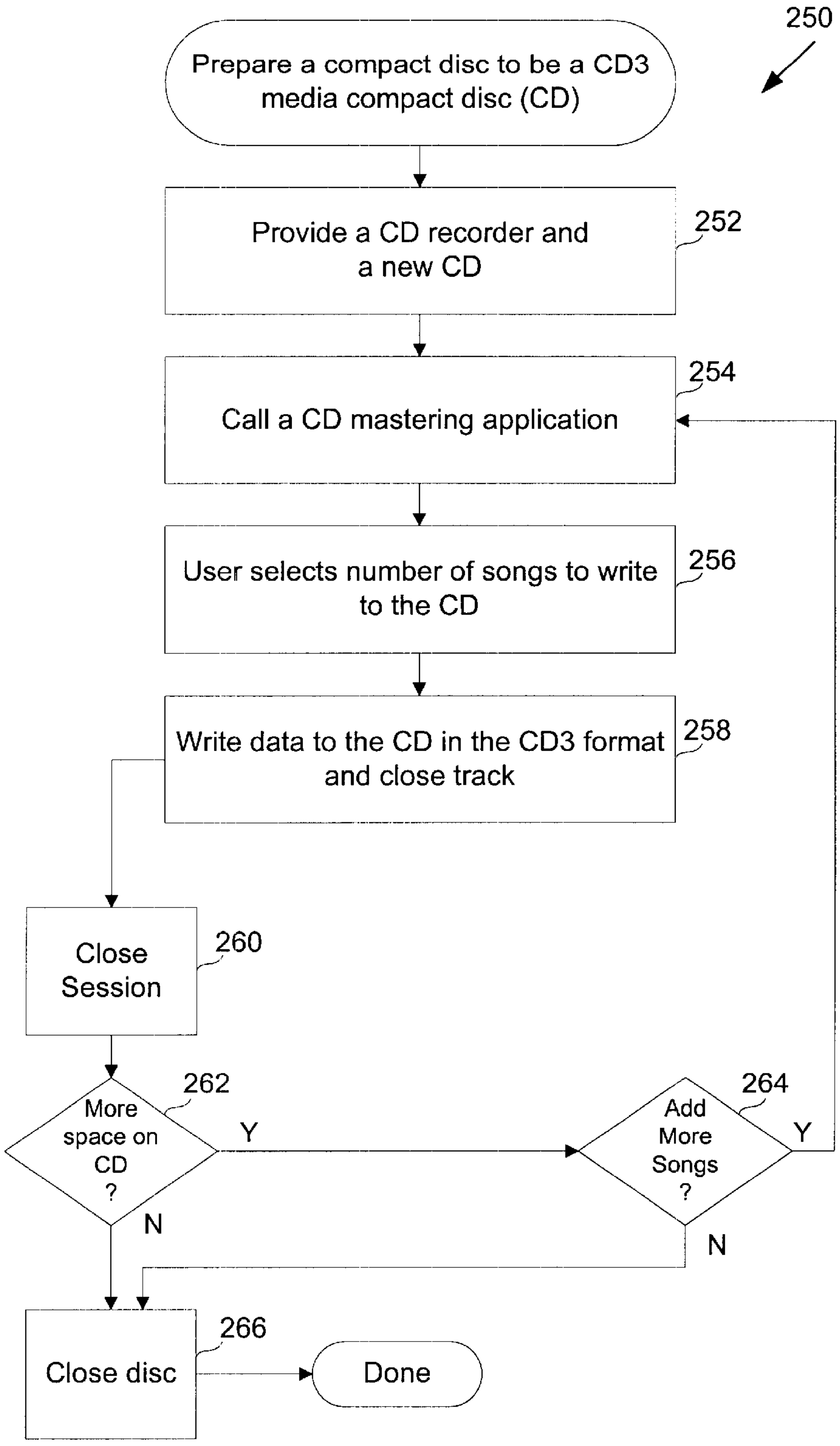
FIG. 7 illustrates a method for preparing a compact disc to be a CD3 music compact disc, in accordance with another embodiment of the present invention.
Figure 8A:
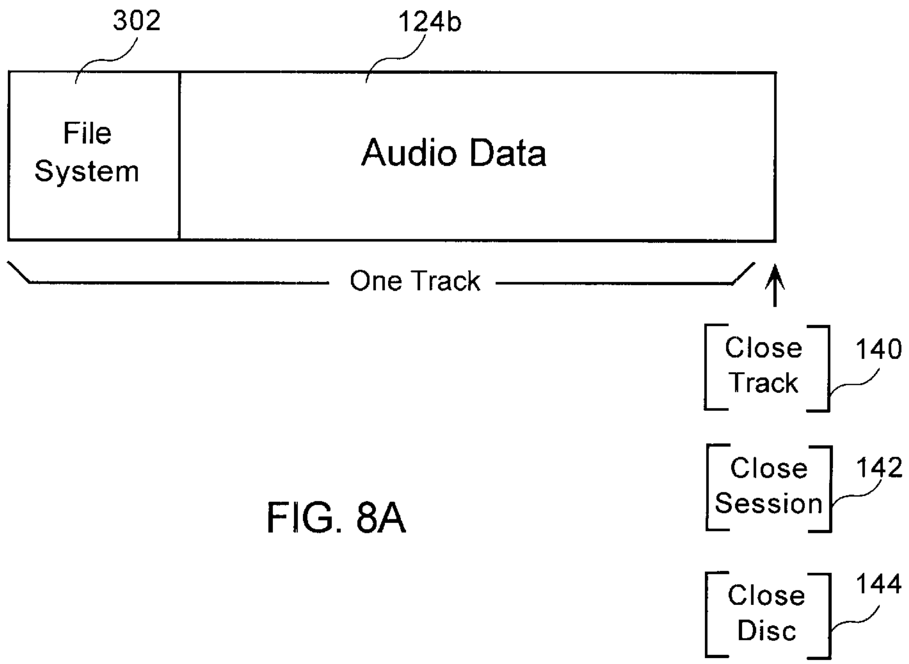
FIG. 8A illustrates the structure of a file system and one track of audio data, in accordance with one embodiment of the present invention.

FIG. 7 illustrates a method for preparing a compact disc to be a CD3 music compact disc, in accordance with one embodiment of the present invention. Flowchart 250 will concentrate on a method in which the entire file system 302 as shown in FIG. 8A will be generated first and then the audio data will follow the file system. This technique differs from that described above wherein the session was not closed after each track, but was closed after a number of tracks were written and then the file system was generated before the session was closed.

The method begins at an operation 252 where a CD recorder and a new CD is provided. Once the CD recorder and the CD are provided, the method will proceed to an operation 254 where a CD mastering application is called. Once the CD mastering application has been called, the user may select a number of songs to write to the CD. The data is then written to the CD in the CD3 format and the track is closed in operation 258. Once the track is closed in operation 258, the method will proceed to an operation 260 where the session will be closed. Now, it is determined in operation 262 whether there is more space on the CD.

If there is, the method will proceed to a decision operation 264 where it is determined whether more songs are to be added to the CD. If more songs are to be added, the method will proceed to operation 254. Alternatively, if no more songs are to be added, the method will proceed to operation 266 where the disc will be closed. Likewise, if it was determined in operation 262 that there was no more space on the CD, the method would also proceed to operation 266 where the disc is closed and then the method will be done.

FIG. 8A illustrates the structure of a file system 302 and audio data 124_b_ which are both part of one track, in accordance with one embodiment of the present invention. As described above, the file system 302 in this embodiment, is first written and then followed by the audio data of the track. Once the audio data has been completely written, the track will be closed 140, the session will be closed 142, and the disc will be closed 144.

Figure 8B:
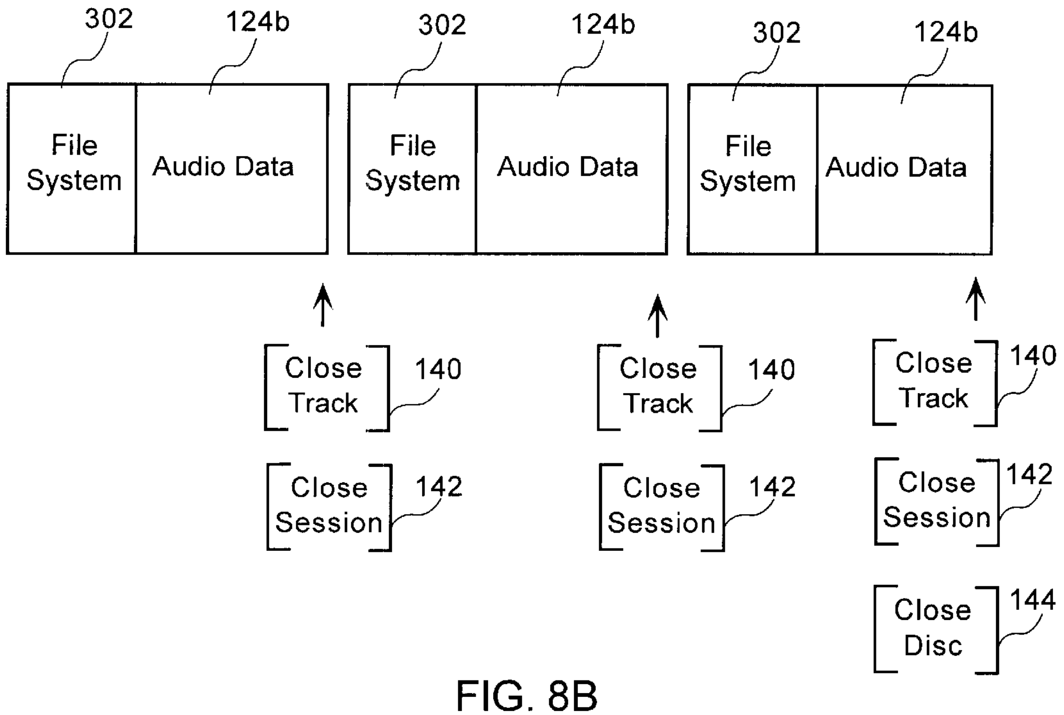
FIG. 8B illustrates a situation in which multiple tracks are written and the session is closed after each track, in accordance with one embodiment of the present invention.

FIG. 8B illustrates a situation in which multiple tracks are written and the session is closed 142 after each track, in accordance with one embodiment of the present invention. As shown, the file system 302 will be written followed by the audio data 124_b_. Once the audio data has been written, the track will be closed 140 and the session will be closed 142. The next file system will then be written and followed by the audio data 124*b*. The track will then be closed 140 and the session will be closed 142. The next file system 302 will then be written and then audio data 124*b*. At this point, the writing of data to the CD will reach a point where the CD will be full. Accordingly, the track will be closed 140, the session will be closed 142, and the disc will also be closed 144.

Figure 9:
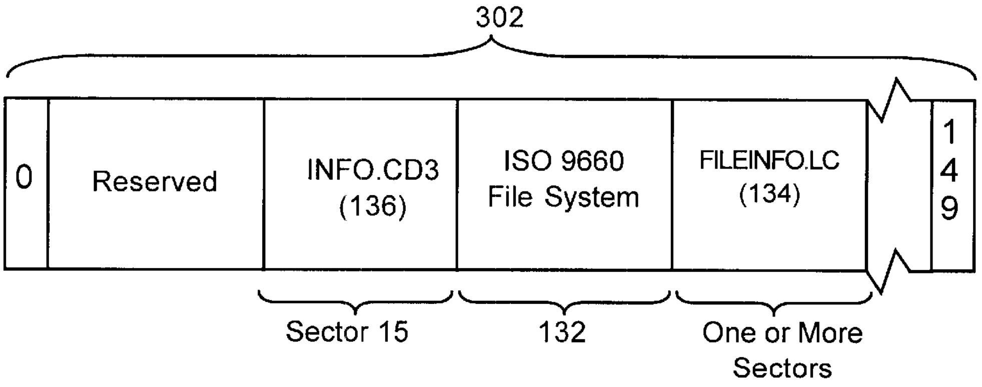
FIG. 9 illustrates a block diagram of the file system of FIGS. 8A and 8B, in accordance with one embodiment of the present invention.

FIG. 9 illustrates a block diagram of the file system 302 in accordance with one embodiment of the present invention. As was the case with the file system of the multiple track single session writing described above, the first part of the file system will be left reserved between tracks zero through 14. In track 15 136, the INFO.CD3 136 will be written, followed by an ISO 9660 file system 132, and the FILEINFO.LC 134. As pictorially illustrated, the FILEINFO.LC 134 can, in this embodiment, fill one or more sectors.

Figure 10:
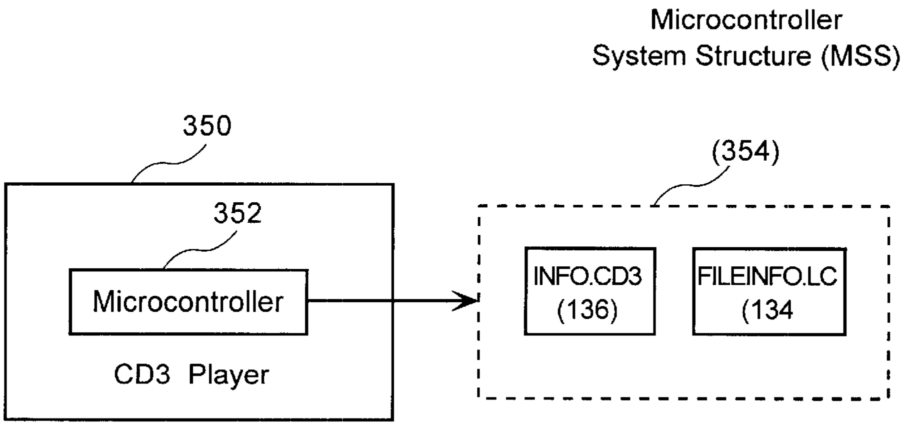
FIG. 10 illustrates a block diagram of a CD3 player which will preferably include a microcontroller.

FIG. 10 illustrates a block diagram of a CD3 player which will preferably include a microcontroller 152. The microcontroller 152 may be in the form of hardware, software, or firmware. In general, the CD3 player can be embodied in the electronics of an automobile audio system, a portable disc player, or a home stereo system, for example. Thus, once the user inserts a CD3 formatted CD into the audio system having the CD3 player 350, the microcontroller 352 will be capable of referring to the microcontroller system structure (MSS) 354, which includes the INFO.CD3 136 and the FILEINFO.LC 134.

In a preferred embodiment, the mechanical and physical properties and the data format of a CD3 music CD disc are in conformance with the Multisession Compact Disc Specification. A CD3 music CD can be a read only disc or a CD-R/CD-RW disc. The data area for a CD3 volume on a CD-ROM shall be comprised of either Mode 1 or Mode 2 Form 1 sectors.

The Logical Sector Addresses of a CD3 music CD disc are calculated in the same way as is defined in the Multisession CD specification. This means that the following formula is used:

$$LSA=4500*PSA[mm]+75*PSA[ss]+PSA[ff]-150$$

In which:

| | | |
|---|---|---|
| LSA | = | Logical Sector Address |
| PSA | = | Physical Sector Address in mm:ss:ff. The PSA of a Sector is the header address of the Sector |
| PSA[mm] | = | mm fraction of the Physical Sector Address |
| PSA[ss] | = | ss fraction of the Physical Sector Address |
| PSA[ff] | = | ff fraction of the Physical Sector Address |

This formula means that the CD3 music CD disc has one address space that starts at zero at the beginning of the disc.

In accordance with the present invention, data retrieval structures for CD3 music CD discs contain one type of Data Retrieval Structure that is compatible to different types of playback systems. By way of example, one playback system may be through the File System Structure (FSS). Another playback technique may be by way of a microcontroller system structure (MSS), which can be independently read by a microcontroller as described above. The microcontroller can, for example, be integrated into a CD3 capable player. Further, the microcontroller can be in the form of a chip, a printed circuit board, firmware, or program instructions executed by the aide of a CPU, or a state machine.

The file system structure (FSS) and the microcontroller readable MSS of a given session therefore give independent access to all the data on the disc from the first session up to and including the current session.

The file system structure (FSS) supports access to the audio compressed files and other data on a disc by computer-based playback such as CD-ROM XA. In this embodiment, a microcontroller-based playback system, such as a CD3 player, can use a microcontroller system structure (MSS). Preferably, the FSS will conform to the CD-ROM XA Specification. The CD-ROM XA Specification defines the content and use of the ISO 9660 Volume Descriptor in a manner that enables the production of discs that play in CD-ROM XA systems. The CD-ROM XA specification also extends the use of the ISO 9660 standard to multisession discs.

Furthermore, a CD3 CD system description will preferably conform to Level 1 of the ISO 9660 levels of interchange. Each session preferably contains a FSS describing the data that can be retrieved from the disc, from the first session up to and including the current session. Therefore, the FSS is recompiled for every session. The FSS of the last session provides access to all the data that can be retrieved from the entire disc, from the first session up to and including the last session. To access all the retrievable data on the entire disc, only the directories and files referred to by the FSS of the last session on the disc need to be used.

Preferably, the directories of a CD3 music CD are:

(a) A Root Directory of a disc, which may contain further directories and or files in addition to those shown in Table A below. The required files in the Root directory are: AUTORUN.INF and the Player Application. The required directory in the root is the CD3 directory.

(b) A CD3 Directory in the Root directory contains all CD3 related directories and files: the DATA directory, the IMAGES directory, the INFO.CD3 file and the FILEINFO.LC Files. The version number of all files must be "1," and in this document the file version numbers are not shown.

TABLE A

| | | | |
|---|---|---|---|
| ROOT---------- | CD3 -----INFO.CD3 | | |
| | | FILEINFO.LC1 | |
| | | FILEINFO.LC2 | |
| | | DATA----------- | FILE0001.MP3 |
| | | | FILE0002.MP3 |
| | | | FILE0003.MP3 |
| | | IMAGES---------- | (optional) |
| | | | IXXXXYY.JPG |
| | | | IXXXXYY.PNG |
| | | | IMAGnnnn.lc |
| | | LYRICS---------- | (optional) |
| | | | LYRYnnnn.lc |
| | | VIDEO---------- | (optional) |
| | | | VXXXXYY.AVI |
| | | | VIDEnnnn.lc |
| | AUTORUN.INF | | |
| | CD3PLAY.EXE (Player) | | |

The file "INFO.CD3 file" is located in the CD3 directory and has a reserved name "INFO.CD3". INFO.CD3 contains information specific to the CD3 music CD. For example, the INFO.CD3 file contains the CD3 music CD system identification, the Album identification and the pointers to the FILEINO.LCn files. INFO.CD3 has a fixed size of one Sector and is located at Sector 15 of the session as will be described with reference to FIG. 6A.

The address of Sector 15 of a session is obtained by adding 00:00:15 to the TOC value of the first track in the program area of the session. In a preferred embodiment, the INFO.CD3 file describes the whole disc, from the first session up to including the current session. To enable this, the INFO.CD3 file is preferably recompiled for every session. Accordingly, INFO.CD3 can be accessed by a computer-based playback system, such as a CD-ROM XA.

TABLE B

INFO.CD3 File Structure

| Byte Position | Size (Bytes) | Field Name | Content |
|---|---|---|---|
| 1..8 | 8 | Disc Signature | "CD3 " |
| 9..12 | 4 | Specific Version Number | "0100" |
| 13..44 | 32 | Volume Name | String |
| 45..60 | 16 | Disc Serial Number | 16 |
| 61..67 | 7 | Disc Creation Date and Time | Date |
| 68..74 | 7 | Disc Modification Date and Time | Date |
| 75..76 | 2 | Number of Files in the CD | UINT16 |
| 77 | 1 | Reserved | $00 |
| 78 | 1 | Number of Languages | Numeric Value = P |
| 79..88 | 10 | FILEINFO_DESCR #1 | |
| . | 10 | .... | |
| . | 10 | FILEINFO_DESCR #N | |
| N or N + 1 | 0..1 | Padding | BYTE ($00) |

As shown in Table B, a specific version number is provided and contains the version number of the CD3 Music CD specification used for the disc, encoded with digits form the ISO 646 character set. The first two digits contain the Major Version Number, the last two digits contain the Minor Version Number. The disc title is an ISO 646 encoded string containing the Volume Name as reported in the ISO 9660 PVD. The session creation date and time contains a time stamp, corresponding to the actual time when the first session on the disc was generated. A short time stamp format is provided in Table C below.

TABLE C

| RBP | Field length | Field name | Contents |
|---|---|---|---|
| 0 | 1 | Year | UINT8 |
| 1 | 1 | Month | UINT8 |
| 2 | 1 | Day | UINT8 |
| 3 | 1 | Hour | UINT8 |
| 4 | 1 | Minute | UINT8 |
| 5 | 1 | Second | UINT8 |
| 6 | 1 | Time Zone | UINT8 |

The following represents an exemplary implementation of the time stamp information described in Table C.

Year (RBP 1)

Number of years since 1900

Month (RBP 2)

Month of the year, from 1 to 12

Day (RBP 3)

Day of the month, from 1 to 31

Hour (RBP 4)

Hour of the day, from 0 to 23

Minute (RBP 5)

Minute of the hour, from 0 to 59

Second (RBP 6)

Second of the minute, from 0 to 59

Time Zone (RBP 7)

Offset to Greenwich Mean Time in number of 15-minute intervals from −48 (West) to +52 (East).

Still referring to Table B, the disc modification date and time contains a time stamp, corresponding the actual time when the disc is updated, for example, when a new session on the disc is generated. For the first session this field contains the same information as the Disc Creation Time and date field. The number of CD3 files in the disc identifies the total number of files stored in the CD3 directory. It can include Audio Compressed files, images, lyrics and the optional files stored in the CD3 directory. It does not include other files stored in different directories than CD3 directory.

The number of languages, is represented by one byte binary code number that specifies the number of FILEINFO_DESCRs in the INFO.CD3 file. At least one language has to be present on the CD3 disc.

The FILEINFO_DESCR in INFO.CD3, as shown in Table B, contains the language code, the location and the size of a FILEINFO.lc file. By way of example, the FILEINFO_DESCR is defined in the Table D below.

TABLE D

| RBP | Field length | Field name | Contents |
|---|---|---|---|
| N..N + 1 | 2 | Language Code (lc) | ISO 639 Language Code |
| N + 2..N + 5 | 4 | Location of FILEINFO.lc | Logical Sector Address |
| N + 6..N + 9 | 4 | Size of FILEINFO.lc | UINT32 |

The language code is a 2-byte string language code field containing the country code used for the FILEINFO.lc file. The country code is the ISO 639 language code. In general, it is encoded in capitals from the ISO 646 character set. Examples of valid Country Codes are shown in Table E:

TABLE E

| | |
|---|---|
| IT | Italian |
| JA | Japanese |
| EN | English |
| NL | Dutch |
| US | USA |

The location of the FILEINFO.LC is defined by a four byte binary number that contains the Logical Sector Address of the FILEINFO.LC file that is referenced from the FILEINFO_DESCR. In a preferred embodiment, the size of the FILEINFO.LC file is obtained by a four byte binary number that contains the size in bytes of the FILEINFO.LC file that is referenced from the FILEINFO_DESCR. A size of zero bytes is not allowed. In general, the FILEINFO.LC file is a variable length data file that contains information for the audio files contained in the DATA directory. The files FILENFO.LC are located in the CD3 directory and have a reserved name "FILEINFO.LC". A disc must contain a minimum of one FILEINFO.LC file. The file name extension "LC" is encoded as a string with a fixed length of 2 characters and contains the Language Code as defined in ISO 639. FILEINFO.LC is configured to describe the whole disc, from the first session up to including the current one. Therefore, the FILEINFO.LC file is recompiled for every track within the session and for every session.

TABLE F

| Byte Position | Size (Bytes) | Field Name | Content |
|---|---|---|---|
| 1 to 8 | 8 | File Identifier | "FILEINFO" |
| 9 to 12 | 4 | Specification Version Number | "0100" |
| 13 to 14 | 1 | Reserved | 00 |
| 14 to 15 | 1 | Character Set Code | UINT8 |
| 16 to 17 | 2 | Number of Audio Files Info | Numeric Value = N |
| 18 to.... | | AudioFileInfo Record 1<br>AudioFileInfo Record N | |

Referring to Table F, the File Identifier field contains "FILEINFO" coded in ISO 646. The Specification Version Number field contains the version number of the CD3 music CD specification used for the disc, encoded with digits form the ISO 646 character set. The first two digits contain the Major Version Number, the last two digits contain the Minor Version Number. The Character Set Code is a one byte binary coded number that defines the character set used in the FILEINFO.LC file. Example character set codes are shown in Table G.

TABLE G

| | |
|---|---|
| $00 | Not Used |
| $01 | ISO 646 |
| $02 | ISO 8859-1 |
| $03 | JIS Roman [14] & JIS Kanji 1990 [168] |
| $04 | Shifted JIS Kanji, including JIS Roman [14] & JIS Katakana [13] |
| $05..$FF | Undefined |

Still referring to Table F, the Number of AudiofileInfo Records is a two byte binary number that identifies the total number of Audio File Info records contained in this file. The value of zero is not allowed. The AudioFileInfo Record is defined by a layout. The preferred layout of the Audio Files Info Record is given in Table H below. An Audio Info Record starts with the length of the current record, the File Name identifier of the Audio File, and the Logical Sector Address, where the Audio file starts and the length in bytes of the compressed audio file.

TABLE H

| Byte Position | Size (Bytes) | Field Name | Content |
|---|---|---|---|
| N | 4 | AUDIOFILEINFO Rec. Length | UINT32 |
| N + 4 | 12 | Audio File Name | "FILEXXXX.EXT" |
| N + 12 + 4 | 4 | Logical Block Address | UINT32 |
| N + 12 + 8 | 4 | Audio File Size | UINT32 |
| N + 12 + 12 | 6 | Audio File Type (CODEC) | String |
| N + 24 + 6 | 1 | Reserved | BYTE |
| N + 24 + 7 | 3 | Uncompressed Audio Length | MFT |
| N + 30 + 4<br>N + M + 30 + 4 − 1 | M | AudioFileInfo__Frame | |

With reference to Table H, the AudioFileInfo Record Length is defined by a 4-byte field that contains the length in bytes of the FILEINFO Record. The File Name character String Field contains the name that the file of the FileInfo Record references. The File Start Address is defined by a 4-byte field that contains the Relative Block Address of the file that is referenced from this FILEINFO Record. The File Size is defined by a 4 byte binary number that contains the size in bytes of the file that is referenced from the FILEINFO record. The File Type field indicates which type of audio compression has been used. The following type and refinements are defined in Table I.

TABLE I

| | |
|---|---|
| MPG1 | MPEG 1 or 2 Layer I |
| MPG2 | MPEG 1 or 2 Layer II |
| MPG3 | MPEG 1 or 2 Layer III |
| MPG2.5 | MPEG 2.5 |
| AAC | Advanced audio Compression |
| WMA | Microsoft Media Audio Format |
| PCM | Pulse Code Modulated Audio |

With reference to Table I and the PCM Audio Length, the original File Size Field contains the length in minutes, seconds, frames. The field is set to 0 if the length of the uncompressed audio file is unknown.

The AudioFileInfo__Frame format is shown in Table J. As used herein, all of the Info__Frames consist of an INFO__PACKED ID, an INFO__PACKET Length, and Data.

TABLE J

| Byte Position | Size (Bytes) | Field Name | Content |
|---|---|---|---|
| N | 1 | FRAME ID | BYTE |
| N + 1 | 1 | FRAME Length | BYTE |
| N + 2..<br>N + M + 1 | M | FRAME Data | |
| N + M + 2 | 0 or 1 | Padding | $00 |

The definition of the FRAME ID is given in Table K.

TABLE K

| FRAME ID | Field Name | Content |
|---|---|---|
| $00 | Unused | — |
| $01 | Album Title | String |
| $02 | UPC | String |
| $03 | ISBN | String |
| $04 | Copyright | String |
| $05 | Track Title | String |
| $06 | Principal Artist | String |
| $07 | Secondary Artist | String |
| $08 | Composer | String |
| $09 | Original Composer | String |
| $0A | Creation Date | Date__String "yyyymmdd" |
| $0B | Publishing Date | Date__String "yyyymmdd" |
| $0C | Publisher | String |
| $0D | ISRC for Audio Track | ISRC__String |
| $0F | ISRC for Lyrics | ISRC__String |
| $11 | DRM & Encryption | Structure |
| $14 | Equalization | — |
| $15..1F | Unused | |
| $21 | Lyrics | Logical Sector Address of the file LYRInnnn.lc |
| $22..$2F | Unused | |
| $30 | Images | Logical Sector Address of File IMAGnnnn.lc |
| $31..$3F | Unused | |
| $40 | VIDEO | Logical block address of VIDEnnnn.lc |
| $41 | Genre Code Group | Maximum 4 Genre Codes, 2 byte binary each. |
| $42 | Tempo | 1 Byte binary number. Tempo in beats per minute. 0 = indefined. |

TABLE K-continued

| FRAME ID | Field Name | Content |
|---|---|---|
| $43 | Key | Key_Code, 1 byte binary number |
| $44..$FF | Unused | |

With reference to Table J, the FRAME length is defined by a 1-byte binary number that contains the length of the Info_Packet Data Field. If the FRAME length is equal to 255, then the next FRAME is a continuation FRAME. A Continuation FRAME has the same FRAME ID as the preceding FRAME. A zero FRAME length is allowed. However, it is recommended that the use of zero length FRAMEs only occur in cases where a continued FRAME is terminated with a total length being a multiple of 255.

TABLE L

LOGICAL SECTOR ADDRESS & FILE SIZE

| Byte Position | Size (Bytes) | Field Name | Content |
|---|---|---|---|
| N + 2 | 4 | Logical Sector Address | UINT32 |
| N + 6 | 4 | File Size in Bytes | UINT32 |

A Digital Rights Management (DRM) & Audio Encryption packet indicates that the audio file is encrypted, and also indicates who performed the encryption. Since standardization of encryption schema is not defined yet, the packet can easily be defined. Genre Code consists of a maximum 4 genre codes, each Genre Code being a 2 byte binary number. Example Genre Codes are defined below in Table M.

TABLE M

| ID3 Codes |
|---|
| 0.Blues |
| 1.Classic Rock |
| 2.Country |
| 3.Dance |
| 4.Disco |
| 5.Funk |
| 6.Grunge |
| 7.Hip-Hop |
| 8.Jazz |
| 9.Metal |
| 10.New Age |
| 11.Oldies |
| 12.Other |
| 13.Pop |
| 14.R&B |
| 15.Rap |
| 16.Reggae |
| 17.Rock |
| 18.Techno |
| 19.Industrial |
| 20.Alternative |
| 21.Ska |
| 22.Death Metal |
| 23.Pranks |
| 24.Soundtrack |
| 25.Euro-Techno |
| 26.Ambient |
| 27.Trip-Hop |
| 28.Vocal |
| 29.Jazz + Funk |
| 30.Fusion |
| 31.Trance |
| 32.Classical |
| 33.Instrumental |
| 34.Acid |

TABLE M-continued

| ID3 Codes |
|---|
| 35.House |
| 36.Game |
| 37.Sound Clip |
| 38.Gospel |
| 39.Noise |
| 40.AlternRock |
| 41.Bass |
| 42.Soul |
| 43.Punk |
| 44.Space |
| 45.Meditative |
| 46.Instrumental Pop |
| 47.Instrumental Rock |
| 48.Ethnic |
| 49.Gothic |
| 50.Darkwave |
| 51.Techno-Industrial |
| 52.Electronic |
| 53.Pop-Folk |
| 54.Eurodance |
| 55.Dream |
| 56.Southern Rock |
| 57.Comedy |
| 58.Cult |
| 59.Gangsta |
| 60.Top 40 |
| 61.Christian Rap |
| 62.Pop/Funk |
| 63.Jungle |
| 64.Native American |
| 65.Cabaret |
| 66.New Wave |
| 67.Psychadelic |
| 68.Rave |
| 69.Showtunes |
| 70.Trailer |
| 71.Lo-Fi |
| 72.Tribal |
| 73.Acid Punk |
| 74.Acid Jazz |
| 75.Polka |
| 76.Retro |
| 77.Musical |
| 78.Rock & Roll |
| 79.Hard Rock |
| 80.Folk |
| 81.Folk-Rock |
| 82.National Folk |
| 83.Swing |
| 84.Fast Fusion |
| 85.Bebob |
| 86.Latin |
| 87.Revival |
| 88.Celtic |
| 89.Bluegrass |
| 90.Avantgarde |
| 91.Gothic Rock |
| 92.Progressive Rock |
| 93.Psychedelic Rock |
| 94.Symphonic Rock |
| 95.Slow Rock |
| 96.Big Band |
| 97.Chorus |
| 98.Easy Listening |
| 99.Acoustic |
| 100.Humour |
| 101.Speech |
| 102.Chanson |
| 103.Opera |
| 104.Chamber Music |
| 105.Sonata |
| 106.Symphony |
| 107.Booty Bass |
| 108.Primus |
| 109.Porn Groove |
| 110.Satire |
| 111.Slow Jam |

TABLE M-continued

| ID3 Codes |
|---|
| 112.Club |
| 113.Tango |
| 114.Samba |
| 115.Folklore |
| 116.Ballad |
| 117.Power Ballad |
| 118.Rhythmic Soul |
| 119.Freestyle |
| 120.Duet |
| 121.Punk Rock |
| 122.Drum Solo |
| 123.A capella |
| 124.Euro-House |
| 125.Dance Hall |

The Key Code Definition is a one Byte binary number that defines the main key used for the Audio File as shown in Table N.

TABLE N

| Key Code | Definition |
|---|---|
| 0 | Not Used |
| 1 | C major |
| 2 | G major (1 #) |
| 3 | D major (2 #) |
| 4 | A major (3 #) |
| 5 | E major (4 #) |
| 6 | B major (5 #) |
| 7 | F# major(6 #) |
| 8 | F major (1 b) |
| 9 | Bb major (2 b) |
| 10 | Eb major (3 b) |
| 11 | Ab major (4 b) |
| 12 | Db major (5 b) |
| 13 | Gb major (6 b) |
| 14..32 | Reserved |
| 33 | A minor |
| 34 | E minor (1 # |
| 35 | B minor (2 #) |
| 36 | F# minor (3 #) |
| 37 | C# minor (4 #) |
| 38 | G# minor (5 #) |
| 39 | D# minor (6 #) |
| 40 | D minor (1 b) |
| 41 | G minor (2 b) |
| 42 | C minor (3 b) |
| 43 | F minor (4 b) |
| 44 | Bb minor (5 b) |
| 45 | Eb minor (6 b) |
| 46..255 | Reserved |

The Padding Field is only used if the FRAME Length is an odd number. This optional one byte is set to $00. A Lyric File is a variable length structure named LYRInnnn.lc, and contains lyrics text for the correspondent audio file FILEnnnn.ext. The LYRInnnn.lc are located in the CD3/LYRICS directory (as shown in FIG. 6B) and have the reserved name LYRInnnn.lc. Each file with lyrics text for the audio file nnnn in the language according to the language code lc, is represented by a file LYRInnnn.lc. The value of the nnnn is the file number equivalent to the audio file nnnn, encoded in ISO 646 as a 4 digit decimal number with a leading zero. The language code "lc" is encoded as a string with a fixed length of two characters. The language code is defined in ISO 639 and is encoded in lower case characters from the ISO 646 character set. The layout of the LRY-Innnn.lc files is provided below in Table O.

TABLE O

| Byte Position | Size (Bytes) | Field Name | Content |
|---|---|---|---|
| 1..8 | 8 | File Identifier | "LYRICS" |
| 9..12 | 4 | Specification Version Number | "0100" |
| 13 to 14 | 1 | Reserved | |
| 14 to 15 | 1 | Character Set Code | BYTE |
| 15..16 | 2 | Number of Lyrics Frames | UINT16 |
| 17.. | | Lyrics Frame 1 | |
| .. | | .. | |
| | 4 | Lyrics Frame N | |

The file identifier field contains "LYRICS", followed by two space characters, coded in ISO 646. The Specification Version number field contains the version number of the CD3 specification used for the disc, encoded with digits from the ISO 646 characters set. The content of this field is identical to the content of the specification version number field in INFO.CD3.

The code character set is a one byte binary coded number that defines the character set used in the FILEINFO.lc file. Exemplary character set codes are provided in Table P.

TABLE P

| | |
|---|---|
| $00 | Not Used |
| $01 | ISO 646 |
| $02 | ISO 8859-1 |
| $03 | JIS Roman [14] & JIS Kanji 1990 [168] |
| $04 | Shifted JIS Kanji, including JIS Roman [14] & JIS Katakana [13] |
| $05..$FF | Undefined |

Still referring to Table O, the number of lyrics frames field contains the total number of lyrics frames contained in the lyrinnnn.lc file. A 0 value is not allowed. The layout of the lyric frame is given in Table Q. The lyric frames must be stored in ascending order of the MSF time code. Each frame must be contained in an even number of bytes.

TABLE Q

| Byte Position | Size (Bytes) | Field Name | Content |
|---|---|---|---|
| N | 1 | Lyrics Frame Length | M + 3 Value |
| N + 1..N + 3 | 3 | Display Time | MSF Time |
| N + 4..N + M + 3 | M | Lyrics String | String |
| N + M + 4 | 1 | Padding | BYTE |

With reference to Table Q, the Lyrics Frame Length contains the length in bytes of all bytes following this field in the Lyrics Frame. The Display Time contains the relative MSF (minutes:seconds:frames) time code at which the lyrics string is intended to be displayed. The Lyrics String field contains a character string with a maximum length of 252 characters. Zero length Strings are allowed. A line break is identified by character $0D. The Padding Byte is only used if the lyrics String length M is an odd number. This optional byte field is set to $00.

The Data Directory contains the Audio Data Files and subdirectories as well. The audio files can be written in different compression and encryption formats. The name of the file follows the following rules. First, the first 4 characters are "FILE" followed by the character representation of progressive decimal number, "0001", "0002" . . . etc. Second, no more than 9999 files can be written is a same directory. Third, the extension of the file is three characters and represents the format (i.e., WAV, MP3, WMA, etc.), as shown in Table R.

TABLE R

| | |
|---|---|
| MPG | MPEG layer formats |
| AAC | Advanced audio Compression |
| MWA | MSAudio Format |
| PCM | Pulse Code Modulated Audio |

The IMAGES directory is a sub-directory of the CD3 directory and has the reserved name "IMAGES". Two exemplary formats are identified in this specification: PNG and JPEG. The file name extension for JPEG is JPG and for the PNG format the extension is PNG. The formats must conform to the relative specification. The name convention for the file image is IXXXXYYY.JPG or IXXXXYYY.PNG. The value of XXXX is the file audio number that the Image refers to, encoded in ISO 646 as a 4 digit decimal number with a leading zero. The value of YYY is a sequential number starting from 001, encoded in ISO 646 as a 3 digit digital number with a leading zero. Each audio file can have a maximum of 999 image files.

Variable Length files with reserved name IMAGnnnn.lc are also contained in the IMAGES directory. The file IMAGnnnn.lc contains info structures of the pictures files related to the audio file nnnn. The value of the nnnn is the file number equivalent to the audio file nnnn, encoded in ISO 646 as a 4 digit decimal number with a leading zero. The language "lc" is encoded as a string with a fixed length of two characters. The languages code is defined in ISO 639 and is encoded in lower case from the ISO 646 character set. The layout of the IMAGnnnn.Ic files is provided below in Table S.

TABLE S

| Byte Position | Size (Bytes) | Field Name | Content |
|---|---|---|---|
| 1..8 | 8 | File Identifier | "IMAGE" |
| 9..12 | 4 | Specification Version Number | "0100" |
| 13 | 1 | Reserved | BYTE |
| 14 | 1 | Character Set Code | BYTE |
| 15..16 | 4 | Number of Image-Info Structures | Image-Info Structure |
| 17..20 | 4 | Image-Info 1 | Image-Info Structure |
| .. | | .. | |
| n..n + 4 | 4 | Image-Info n | Image-Info Structure |

The file identifier field contains "IMAGE", followed by a 3 space character coded in ISO 646. The Specific version number contains the version number of the CD3 specification used for the disc, encoded with the digits from the ISO 646 character set. The content of the field is identical to the content of the specification version number field in INFO.CD3.

The character set code is a one byte binary coded number that defines the character set used in FILEINFO.lc. Exemplary character set codes are provided in Table P. The Field Number of Image-Info Structures contains the total number of picture-Info Structures contained in the file IMAGnnnn.lc. Table T below describes the layout of IMAGE-Info Structure.

TABLE T

| Byte Position | Size (Bytes) | Field Name | Content |
|---|---|---|---|
| 1..4 | 4 | Image File Type | "JPG or PNG" |
| 9..12 | 4 | Image Location | Logical Block Address |
| 13 | 4 | Image Length | UINT32 |

The Field Picture File Type contains the format identification of the file encoded in ISO 646 character set. The Field Picture File Location contains the Logical Block Address where the image begins. The Image Length contains the length in bytes of the Image.

The VIDEO directory is a sub-directory of the CD3 directory and has the reserved name "VIDEO". One exemplary format, such as AVI, is identified in this application. The formats should conform to the relative specification. The name convention for the video file is VXXXX-YYY.AVI. The value of XXXX is the file audio number that the video refers to, encoded in ISO 646 as a 4 digit decimal number with a leading zero. The value of YYY is a sequential number starting from 01, encoded in ISO 646 as a 3 digit decimal number with a leading zero. Each audio file can have a maximum of 999 video files.

Variable Length files with reserved name VIDEnnnn.lc are also contained in the VIDEO directory. The file VIDEnnnn.lc, contains info structures of the video files related to the audio file nnnn. The value of the nnnn is the file number equivalent to the audio file nnnn, encoded in ISO 646 as a 4 digit decimal number with a leading zero. The language "lc" is encoded as a string with a fixed length of two characters. The language code is defined in ISO 639 and is encoded in lower case from the ISO 646 character set. The layout of the VIDEnnnn.lc files is provided below in Table U.

TABLE U

| Byte Position | Size (Bytes) | Field Name | Content |
|---|---|---|---|
| 1..8 | 8 | File Identifier | "VIDEO" |
| 9..12 | 4 | Specification Version Number | "0100" |
| 13 | 1 | Reserved | BYTE |
| 14 | 1 | Character Set Code | BYTE |
| 15..16 | 4 | Number of Picture-Info Structures | Video-Info Structure |
| 17..20 | 4 | Video-Info 1 | Video-Info Structure |
| .. | | .. | |
| n..n + 4 | 4 | Video-Info n | Video-Info Structure |

The file identifier field contains "VIDEO", followed by a 3 space character coded in ISO 646. The Specific Version number contains the version number of the CD3 specification used for the disc, encoded with the digits from the ISO 646 character set. The content of the field is identical to the content of the specification version number field in INFO.CD3. The character set code is a one byte binary coded number that defines the character set used in the FILEINFO.lc. Exemplary character set codes are provided in Table P. The Field Number of Video-Info Structures contains the total number of picture-Info Structures contained in the file VIDEnnnn.lc. The layout of the VIDEO-Info Structure is provided in Table V.

TABLE V

| Byte Position | Size (Bytes) | Field Name | Content |
|---|---|---|---|
| 1..4 | 4 | Video File Type | "AVI" |
| 9..12 | 4 | Video Location | Logical Block Address |
| 13 | 4 | Video Length | UINT32 |

The Field Picture File Type contains the format identification of the file encoded in the ISO 646 character set. The Field Picture File Location contains the Logical Block Address where the video begins. The Video Length Field contains the length in bytes of the Video file.

The file AUTORUN.INF is an ISO 646 encoded text located in the root directory and has the reserved name "AUTORUN.INF". AUTORUN.INF contains lines of text which refer to the executable programs for various computer platforms and other computer platform specific items. In a preferred embodiment, the file AUTORUN.NF is divided into Vendor_Group sections. A Vendor_Group section starts with a one line Vendor_ID, followed by zero or more vendor specific lines. The Vendor_ID consists of a "[" character followed by a Vendor_String, followed by a "]" character, followed by a line delimiter. The line delimiter used in this file is $0D,$A. Vendor_Strings are not case sensitive.

The following is an example of the content of the AUTORUN.INF file.

[autorun]
open=cd3.exe
icon=cd3.ico;
in this example, the open command is used and specified by the specific operating system vendor to define method; to start the application "cd3.exe" and create an icon for the application using the file "cd3.ico".

[ . . . ]

The present invention may be implemented using any type of integrated circuit logic, state machines, or software driven computer-implemented operations. By way of example, a hardware description language (HDL) based design and synthesis program may be used to design the silicon-level circuitry necessary to appropriately perform the data and control operations in accordance with one embodiment of the present invention. By way of example, a VHDL® hardware description language available from IEEE of New York, N.Y. may be used to design an appropriate silicon-level layout.

The invention may employ various computer-implemented operations involving data stored in computer systems to drive computer peripheral devices (i.e., in the form of software drivers). These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for writing compressed audio data to a compact disc media, comprising:

beginning a session writing the compressed audio data to the compact disc media;

writing a track including a file system and audio data, the writing of the track that includes the file system further comprises, writing an INFO.CD3 file;

writing an ISO file system after the INFO.CD3 file is written;

writing a FILEINFO.LC file following the ISO file system;

closing the track; and closing the session.

2. A method for writing compressed audio data to a compact disc media as recited in claim 1, wherein the ISO file system includes a pointer to the INFO.CD3 file and the FILEINFO.LC file.

3. A method for writing compressed audio data to a compact disc media as recited in claim 1, wherein the INFO.CD3 file includes a pointer to the FILEINFO.LC file.

4. A method for writing compressed audio data to a compact disc media as recited in claim 1, wherein the INFO.CD3 and the FILEINFO.LC files define a microcontroller system structure (MSS) that is independently accessible to a microcontroller-based player.

5. A method for writing compressed audio data to a compact disc media as recited in claim 1, wherein the FILEINFO.LC file incorporates pointers to audio files, image files, video files, and lyrics files.

6. A method for writing compressed audio data to a compact disc media as recited in claim 1, wherein when the file system is written, the method includes, writing the INFO.CD3 file to a sector 15 of the track;

writing the ISO file system beginning at a sector 16 of the track; and writing the FILEINFO.LC file at location following the file system.

7. A method for writing compressed audio data to a compact disc media as recited in claim 1, further comprising:

beginning a second session writing the compressed audio data to the compact disc media;

writing a second track including a file system and an audio data section, the writing of the second track that includes the file system further comprises, writing another INFO.CD3 file to the second track;

writing another ISO file system to the second track;

writing another FILEINFO.LC file following the ISO file system of the second track;

closing the second track after completing the writing of the audio data section; and closing the second session.

8. A computer readable media having program instructions for writing compressed audio data to a compact disc media, the operations of the computer readable media comprise:

program instructions for beginning a session writing the compressed audio data to the compact disc media;

program instructions for writing a track including a file system and an audio data section, the writing of the file system further comprises, program instructions for writing an INFO.CD3 file;

program instructions for writing an ISO file system;

program instructions for writing a FILEINFO.LC file following the ISO file system;

program instructions for closing the second track; and program instructions for closing the session.

9. A computer readable media having program instructions for writing compressed audio data to a compact disc media as recited in claim 8, wherein the ISO file system is an ISO 9660 file system.

10. A computer readable media having program instructions for writing compressed audio data to a compact disc media as recited in claim 8, wherein the INFO.CD3 file includes a pointer to the FILEINFO.LC file.

11. A computer readable media having program instructions for writing compressed audio data to a compact disc media as recited in claim 8, wherein the INFO.CD3 and the FILEINFO.LC files define a microcontroller system structure (MSS) that is independently accessible to a microcontroller-based player.

12. A computer readable media having program instructions for writing compressed audio data to a compact disc media as recited in claim 8, wherein when the file system is written, the program instructions include, program instructions for writing the INFO.CD3 file to a sector 15 of the track;

program instructions for writing the ISO file system beginning at a sector 16 of the track; and program instructions for writing the FILEINFO.LC file at a location following the file system.

* * * * *